Aug. 21, 1934.　　　　C. M. READ　　　　1,971,166
SPEED CHANGING DEVICE
Filed Feb. 8, 1932　　　2 Sheets-Sheet 1
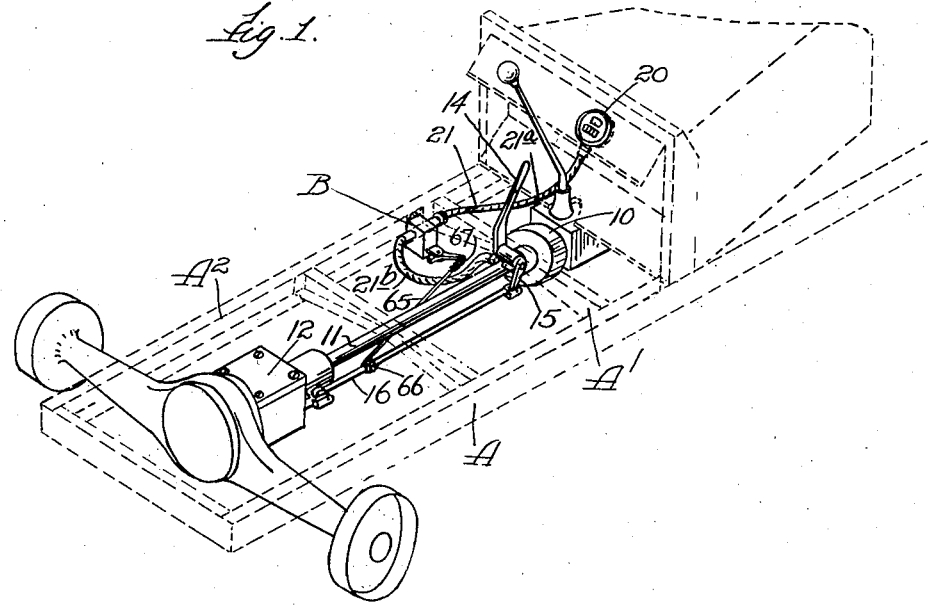
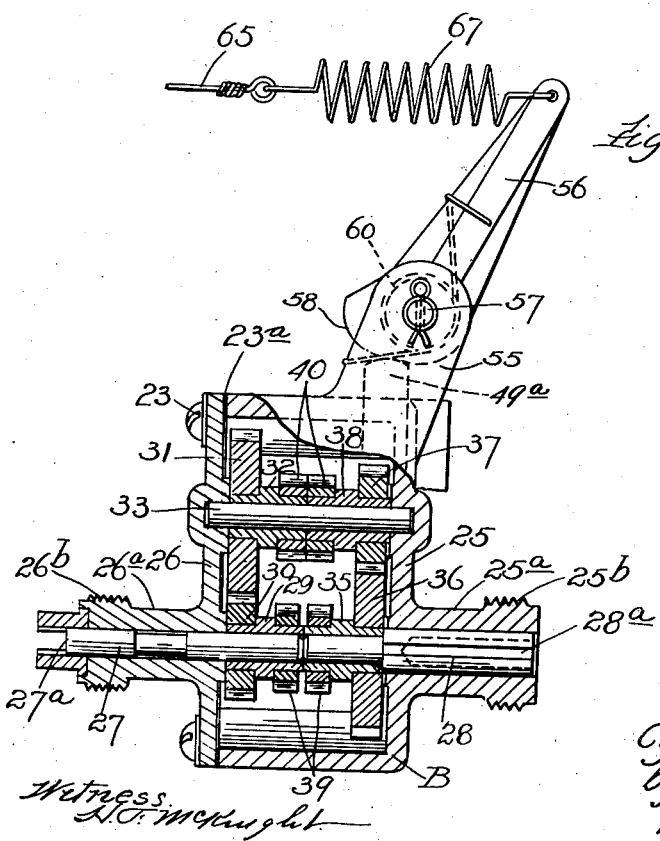
Inventor
Cyril M. Read.
by Burton & Burton
his Attorneys.

Aug. 21, 1934.                C. M. READ                1,971,166
SPEED CHANGING DEVICE
Filed Feb. 8, 1932                2 Sheets-Sheet 2
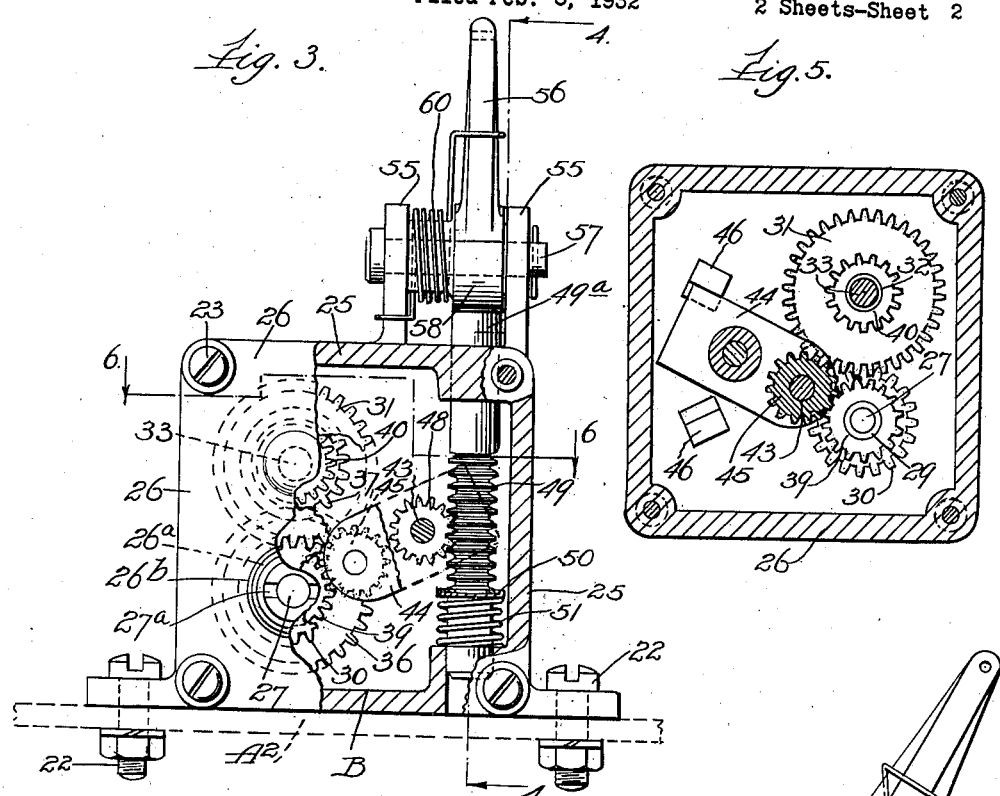
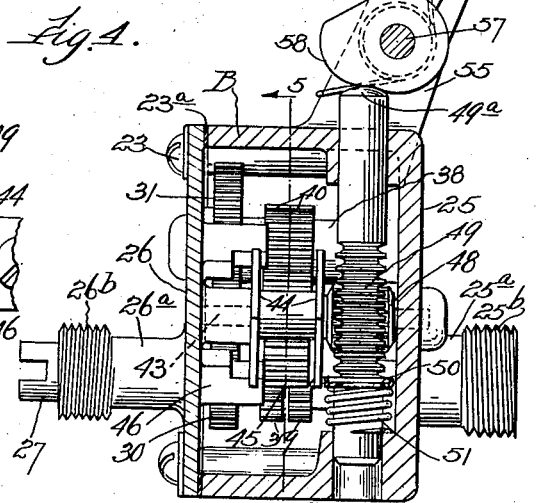
Witness.
H. F. McKnight.
Inventor.
Cyril M. Read.
by Burton & Burton
his Attorneys.

Patented Aug. 21, 1934

1,971,166

UNITED STATES PATENT OFFICE 1,971,166

SPEED CHANGING DEVICE

Cyril M. Read, Oak Park, Ill., assignor to Stewart-Warner Corporation, Chicago, Ill., a corporation of Virginia Application February 8, 1932, Serial No. 591,472

16 Claims. (Cl. 74—59)

This invention relates to motion-transmitting mechanism, and has for an object the provision of means (herein termed an "adapter" or "change speed device"), adapted to be inserted between the selective, multi-speed gear box of a machine or mechanism and some piece of apparatus driven from the input side of the gear box,—the "adapter" serving to drive said apparatus at a speed directly proportional to the speed at the output side of the gear box. A further object resides in the provision of means for the purpose indicated, which is automatically adjustable in response to the selective adjustment of the multi-speed gear box, for varying the speed of the apparatus in proportion to the selected gear box speed.

For the purpose of illustrating the preferred embodiment of the present invention, I have shown it in connection with an automotive vehicle equipped with a selective multi-speed differential or its equivalent and a speedometer operatively driven from the transmission. The change speed device is interposed between the transmission and the speedometer, and is operably connected to the shifting element of the multi-speed differential in a manner to automatically maintain a constant speed ratio between the speedometer and the driving road wheels of the vehicle.

It will be understood that the present invention is not to be limited to the preferred embodiment illustrated, as it is apparent that it is capable of adaptation to various uses, and in connection with various types of apparatus, machines, etc.

The following description will be more readily understood by referring to the accompanying drawings, in which,—

Figure 1 is a fragmentary diagrammatic perspective view of an automotive vehicle equipped with the present invention.

Figure 2 is an enlarged sectional view through the device embodying the present invention.

Figure 3 is an enlarged view with portions broken away to show details of construction, taken at right angles to Figure 2, looking to the right.

Figure 4 is a sectional view taken as indicated at line 4—4 on Figure 3.

Figure 5 is a sectional view taken at line 5—5 on Figure 4.

Figure 6 is a sectional view taken as indicated at line 6—6 on Figure 3.

Referring now particularly to Figure 1 of the drawings, an automotive vehicle chassis is indicated in dotted outline at A, having a transmission indicated by the casing, 10, connected by a drive shaft, 11, to a multi-speed differential indicated by the casing at 12. By way of explanation it may be said that a multi-speed differential is constructed to provide two or more driving speeds at the rear axle of the vehicle (independently of the transmission) and is especially adaptable for use in connection with trucks, busses and the like. The purpose of a multi-speed differential is primarily to provide the vehicle with a normal speed for road travel while also providing a slower speed, developing more power, which is suitable for special tractive requirements, as in hill climbing or heavy hauling. Vehicles equipped with the multi-speed type of differential are usually provided with an operating lever, as indicated at 14, journaled on cross member, A¹, of the chassis frame, and having a depending crank arm, 15, connected to a longitudinally reciprocable operating rod, 16, the rear end of which is connected to the differential in a manner to shift the gearing for varying the gear ratio and accordingly varying the drive speed of the axle. The operating lever is positioned in a convenient location in the driving compartment for quick and easy manipulation by the driver.

It will be understood that the multi-speed gearing is commonly associated with the differential gearing merely as a matter of convenience and without modifying the usual function or operation of the differential itself.

It may be understood that when the lever, 14, is in the position indicated in the drawings, the gearing in the differential is adjusted at a low speed gear ratio, that is, less than the gear ratio of a vehicle of conventional specifications, so as to obtain increased power at the rear axles, and when the lever, 14, is pulled rearwardly, the rod, 16, is shifted forwardly, thereby shifting the gearing in the differential so as to bring into driving engagement a set of gears having a ratio which gives a normal driving speed.

A speedometer, indicated by the casing at 20, is connected by a flexible shaft, indicated by the casing at 21, to the transmission, 10, in a usual manner, and it is to be understood that the term "speedometer" as used throughout the description and claims is to be interpreted in its broadest sense in accordance with the meaning in the trade, to indicate an instrument for indicating the speed of a vehicle or an odometer for recording distance, or a combined instrument for indicating both speed and distance. It is common practice to drive the speedometer directly from the propeller shaft or a connected element of the transmission, and to design the drive connection so as to give proper speed and mileage indications for a given gear ratio of the differential, but obviously, when this ratio is changed by means of a special set of gears associated with the differential, the speed, as registered by the speedometer, and likewise the mileage indicated, would be incorrect, and accordingly this invention is designed to overcome the difficulty.

For this purpose my speed changing device or "adapter", indicated generally at B, is interposed between two portions, 21ª and 21ᵇ, of the flexible shaft, connecting the speedometer to the transmission. This "adapter" is preferably mounted on the inside of one of the channel side frames, A², herein shown as the left-hand side, and is secured in place by means of bolts, 22. The "adapter" comprises a two-part casing, including a main housing part, 25, and a cover part, 26, which is secured thereto by machine screws, 23, with a gasket, 23ª, interposed.

As illustrated in Figure 2, the casing includes axially aligned, oppositely extending sleeves, 25ª and 26ª, respectively, which serve as journal bearings for two axially aligned stub shafts, 27 and 28, respectively. The outer ends of the sleeves, 25ª and 26ª, are threaded, as indicated at 25ᵇ and 26ᵇ, respectively, for connection with the flexible shaft casing, while the respective stub shafts, 27 and 28, are formed with the usual driving features, 27ª and 28ª, respectively for driving connection with the flexible shafts proper in a conventional manner. These two stub shafts are approximately of the same length and terminate in substantially abutting relation, end to end, adjacent the center of the casing proper. Drive-fitted on the inner end of stub shaft, 27, is a bushing, 29, on which is rigidly mounted, adjacent the inside of the cover, 26, a spur gear, 30, which is meshed with a gear, 31, of larger diameter, which in turn is rigidly secured on a bushing, 32, loosely journaled on a shaft, 33, extending parallel to the axis of the two stub shafts, and having its ends journaled in the casing parts, 25 and 26, respectively, as seen in Figure 2.

Rigidly mounted on the inner end of the stub shaft, 28, within the casing, is a bushing, 35, on which is drive-fitted and disposed adjacent the wall of the casing part, 25, a spur gear, 36, meshing with a spur gear, 37, of lesser diameter, which is rigidly mounted on a bushing, 38, loosely journaled on the shaft, 33. Rigidly mounted on the inner and adjacent ends of the bushings, 30 and 35, respectively, are a pair of gears, 39, and similarly secured on the inner ends of the bushings, 32 and 38, respectively, are a pair of gears, 40, registering with the gears, 39. These pairs of gears, 39 and 40, act as independent clutch members by means of which the speed of the stub shaft, 28, with respect to the stub shaft, 27, is controlled. Rigidly mounted on a shaft, 43, for pivotal movement about the axis thereof, which is parallel to the shafts, 27, 28 and 33, is a clutch device comprising a pair of parallel axially spaced side frames, 44, having pivotally mounted therebetween at their outer ends a pinion, 45, provided with a relatively wide face and adapted to selectively engage with either pair of gears, 39 and 40, respectively. This pivot shaft, 43, is journaled at its outer ends in the walls, 25 and 26, of the casing, and a pair of oppositely facing lugs, 46, are provided on the inside of the cover, 26, against which the side frame, 44, abuts for limiting its movement about the pivot axis of shaft 43. Rigidly secured on said shaft, 43, adjacent one of the side frames, 44, is a pinion, 48, operatively meshed with a rack, 49, which is journaled for reciprocatory movement in the end walls of the casing part, 25.

This rack, 49, for convenience is made in cylindrical form with the rack teeth extending circumferentially thereabout and is provided with a stop shoulder, 50, adjacent the end inside the casing against which shoulder reacts a coil spring, 51, stopped at its opposite end against the wall of the casing and thus tending to yieldingly shift the rack, 49, upwardly with its upper end, 49ª, projecting exteriorly of the casing in which position the pinion, 45, is in operative engagement with the pair of gears, 39, by means of which the drive from the stub shaft, 27, is transmitted directly to the stub shaft, 28, which is connected by the flexible shaft, 21ª, to the speedometer, 20. It will be understood that this direct drive connection between the two stub shafts, 27 and 28, respectively, corresponds to the high or normal gear ratio of the differential, and when the clutch device is swung about its pivot axis for engaging the pair of gears, 40, it will be seen that the drive from the stub shaft, 27, is transmitted through the gears, 30, 31, and by means of the gear, 45, the pair of gears, 40, serve to transmit the rotation directly from the gear, 31, to the gear, 37, which in turn is meshed with the gear, 36, for driving the stub shaft, 28. As will be manifest when the drive is through the system of gearing above referred to, the speed of the stub shaft, 28, will be considerably reduced as compared with the speed of the driving stub shaft, 27. The gear ratio of the "adapter" naturally will depend upon the particular use of the device, and the speed between the driving stub, 27, and the driven stub, 28, may be either reduced (as herein shown) or increased from the output transmission speed, merely by transposing the set of gears, 30 and 36, with the gears, 31 and 37, respectively, and obviously the ratio of change may be altered by changing the relative sizes of these gears.

Extending laterally from the end of the casing part, 25, is a pair of spaced lugs, 55, between which is mounted a lever arm, 56, on a pivot, 57. This lever arm is formed with a cam portion, 58, engaging the upper end, 49ª, of the rack, 49, so that when the arm, 56, is swung about its pivot in counter-clock-wise direction, as viewed in Figure 4, the cam, 58, will shift the rack, 49, in axial direction against the reaction of the spring, 51, thus causing the clutch device to swing about its pivot, bringing the clutching gear, 45, into engagement with the pair of gears, 40, for the purpose above described. When the pressure or pull on the arm, 56, is relieved, the coil spring, 51, will return the rack with the upper end projecting outwardly, thus permitting return of the gear, 45, to clutching engagement with the pair of gears, 39, which provides the normal one-to-one drive speed between the two stub shafts, 27 and 28. A spring, 60, is coiled about the hub portion, 56ª, of the lever arm, 56, and has one of its ends crimped around one of the lugs, 55, and its other end crimped around the arm, 56, in a manner normally tending to rotate the arm about its pivot, 57, in a direction to disengage its cam, 58, with the upper end of the rack, 49ª, thus insuring that the rack may be shifted to its original position by the coil spring, 51.

When the operating lever, 14, is in its forward position, as seen in Figure 1, (at which position the low speed gears in the differential are in mesh), the shifting rod, 16, is at its rearward limit, and through the connection, 66, the flexible member is also pulled rearwardly, which in turn has swung the lever arm, 56, to shift the drive connections in the "adapter" (as above described), by means of which the driven stub shaft, 28, is reduced in speed with respect to the stub shaft, 27, in the same proportion as the difference in the gear ratios of the selective differential gears. Accordingly, when the lever, 14, is pulled rearwardly, (at which position selective gears in the differential are engaged to provide a normal driving speed for the vehicle), the tension in the member, 65, is released, and by springs, 51 and 60, the gearing in the "adapter" is shifted in a position to provide a one-to-one drive between the stub shafts, 27 and 28. The purpose of spring 67 is to permit more play or movement of the rod, 16, than is needed for shifting the lever arm, 56.

It is apparent that the "change speed device" or "adapter" may be constructed and arranged for a direct connection of the driving stub, 27, with the output end of the transmission, entirely dispensing with the flexible shaft portion, 21ᵇ; or the adapter may be made as an inbuilt unit of the transmission. Or, the other section of flexible shafting, 21ᵃ, may be eliminated where it is more convenient to mount the "adapter" unit closely adjacent the speedometer head.

Although I have shown and described one particular arrangement and embodiment of my invention, it will be understood that it is capable of adaptation to various uses and for association with various apparatus, machines, etc. I do not therefore wish to be understood as limiting myself to the specific arrangement and embodiment illustrated herein, excepting as indicated in the appended claims.

I claim:—

1. In an automobile, a wheel driving axle, a power transmitting shaft associated therewith, means for providing a plurality of different relative speed ratios between said axle and shaft, a speedometer, a driving shaft for the speedometer, means for driving said last mentioned shaft at different relative speed ratios from said power transmitting shaft, and means for selecting the desired relative speed ratio between said axle and said power transmitting shaft and a corresponding relative speed ratio between said speedometer driving shaft and said power transmitting shaft.

2. In an automobile, a wheel driving axle, a power transmitting shaft, mechanism for providing a plurality of relative speed ratios between said axle and shaft, a speedometer, a driving shaft therefor, another mechanism including constant mesh gearing operable to provide a plurality of relative speed ratios between the speedometer driving shaft and said power transmitting shaft, and means for manipulating said gearing to co-ordinate the speedometer driving shaft with the axle.

3. In combination with a vehicle having driving mechanism including a power transmission and a manually adjustable multi-speed differential; a speedometer having driving connection with the transmission, and means automatically adjustable for varying the driving speed of the speedometer in proportion to the differential speed, in response to selective adjustment of said multi-speed differential.

4. In combination with a vehicle having driving mechanism including a power transmission and a two speed differential provided with operating linkage for changing the gear ratio thereof at will, a speedometer, and a device interposed between the driving mechanism and the speedometer for driving the latter, said device having gearing arranged to be selectively operated in a predetermined manner for varying the speed imparted to the speedometer in proportion to the change in gear ratio of the differential.

5. In combination with a vehicle having driving mechanism including a power transmission and a two speed differential provided with operating linkage for changing the gear ratio thereof at will, a speedometer, a device interposed between the driving mechanism and the speedometer, for driving the latter, said device having gearing arranged to be selectively operated for varying the speed imparted to the speedometer, and means interconnecting said device and said operating linkage for simultaneously changing the gear ratio in the differential and for adjusting the gearing in the device for varying the speed imparted to the speedometer in proportion to the change in gear ratio of the differential.

6. In combination with a vehicle having driving mechanism including a transmission and a two-speed differential provided with operating linkage including a shifting rod for changing the gear ratio thereof at will, a speedometer, a speed changing device interposed between the transmission and the speedometer for driving the latter, said device including selective gearing for varying the speed imparted to the speedometer in proportion to the change of gear ratio of the differential, an operating lever for selectively engaging said gearing, linkage connecting said lever to the shifting rod of the differential, whereby the actuation of the rod for changing the gear ratio of the differential automatically shifts the gearing in the speed changing device to the proper ratio.

7. In combination with a vehicle having driving mechanism, including a transmission and a two-speed differential provided with operating linkage including a shifting rod for changing the gear ratio thereof at will, a speedometer, a flexible shaft connected to the speedometer, a second flexible shaft operatively connected at one end for driving by the transmission, and a change speed device connected to the other ends of said shafts for transmitting motion from one to the other, said device including selective gearing for varying the speed of the shaft connection to the speedometer in proportion to the change of gear ratio of the differential, an operating lever for selectively engaging said gearing, and linkage connecting said lever to the shifting rod of the differential whereby the actuation of the rod for changing the gear ratio of the differential automatically shifts the gearing in the change speed device to the proper speed ratio.

8. In combination with a vehicle having driving mechanism which includes a variable speed transmission and secondary speed varying gear together with an operating member for adjusting the gear ratio of said secondary gear at will, and a speedometer connected for actuation by a driving element which constitutes the connection between said transmission and said secondary gearing, the speedometer drive connection comprising two flexible shafts and an adapter connecting them, the free end of one shaft being connected to the speedometer and the free end of the other shaft being arranged for actuation by said driving element, said adapter including gearing selectively adjustable for varying the speed of the shaft leading to the speedometer with respect to the speed of the other shaft, and means for effecting said selective adjustment of the adapter automatically upon changing the effective gear ratio of the secondary speed varying gear.

9. In a device for the purpose indicated, a two part casing, a driving stub shaft and a driven stub shaft journaled in the respective casing parts in axial alignment with each other, the outer end of one of said shafts being formed for connection to a suitable source of power, rotation communicating means for connecting the adjacent inner ends of said shafts carried by said stub shafts respectively, a gear rigidly mounted on each stub shaft, a shaft extending parallel to said stub shafts and having its ends journaled in the respective casing parts, two gears on the parallel shaft, rotatable independently of each other and axially spaced for engagement respectively with the gears on the stub shafts, cooperative rotation-communicating means operatively associated with the gears on the parallel shaft, and means arranged for alternatively engaging either the rotation-communicating means of the stub shafts or the said means of the parallel shaft for transmitting motion from the driving stub shaft to the driven stub shaft.

10. In the combination defined in claim 9, said cooperative rotation-communicating means being composed of similar gears on the respective aligned shafts and an idler gear engageable with both of said gears for connecting them.

11. In the combination defined in claim 9, said gears being dimensioned so that when the rotation-communicating means on the intermediate shaft are operatively engaged, the driven stub shaft will rotate at a different speed than the driving stub shaft.

12. In the combination defined in claim 9, a support for said alternative rotation-communicating engaging means mounted on a pivot axis together with exteriorly accessible means for swinging said alternative engaging means and support about its pivotal axis into or out of engagement with the respective pairs of rotation-communicating members.

13. In a device for the purpose indicated, a two part casing, a driving stub shaft and a driven stub shaft journaled in the respective casing parts in axial alignment with each other, the outer end of one of said shafts being formed for connection to a suitable source of power, rotation-communicating members on the inner adjacent ends of said shafts carried by said stub shafts respectively, a gear rigidly mounted on each stub shaft, a shaft extending parallel to said stub shafts and having its ends journaled in the respective casing parts, two gears on the parallel shaft, rotatable independently of each other and axially spaced for engagement respectively with the gears on the stub shafts, cooperative rotation-communicating members operatively associated with the gears on the parallel shaft, engageable and disengageable rotation-communicating means mounted on a pivot axis parallel to the axes of said shafts, means exteriorly accessible for swinging said pivotally mounted means about its axis for alternatively operatively connecting either the rotation-communicating members of the stub shafts or the rotation-communicating members of the parallel shaft, and yielding means normally tending to maintain said rotation-communicating engaging means operatively connecting said rotation-communicating members of the stub shafts.

14. In a device for the purpose indicated, a two part casing, a driving stub shaft and a driven stub shaft journaled in the respective casing parts in axial alignment with each other, the outer end of one of said shafts being formed for connection to a suitable source of power, rotation-communication members on the inner adjacent ends of said shafts carried by said stub shafts respectively, a gear rigidly mounted on each stub shaft, a shaft extending parallel to said stub shafts and having its ends journaled in the respective casing parts, two gears on the parallel shaft, rotatable independently of each other and axially spaced for engagement respectively with the gears on the stub shafts, cooperative rotation-communicating members operatively associated with the gears on the parallel shaft, a pivot shaft journaled in said casing parts, rotation-communicating means mounted on said shaft, a rack and pinion arranged in the casing with the pinion on said shaft, whereby longitudinal motion of the rack swings the rotation-communicating means about the pivot axis into and out of engagement alternatively with the pairs of rotation-communicating members on the stub shafts or those on the parallel shaft, and an operating lever for actuating said rack.

15. In the combination defined in claim 14, said operating lever having a cam engageable with the end of the rack for moving it longitudinally, and a spring normally opposing such movement of the rack.

16. In the combination defined in claim 14, stop lugs on the casing for limiting the range of swinging movement of said rotation-communicating means.

CYRIL M. READ.